Jan. 24, 1939. J. W. MacCLATCHIE 2,144,736
PACKING
Filed July 2, 1935
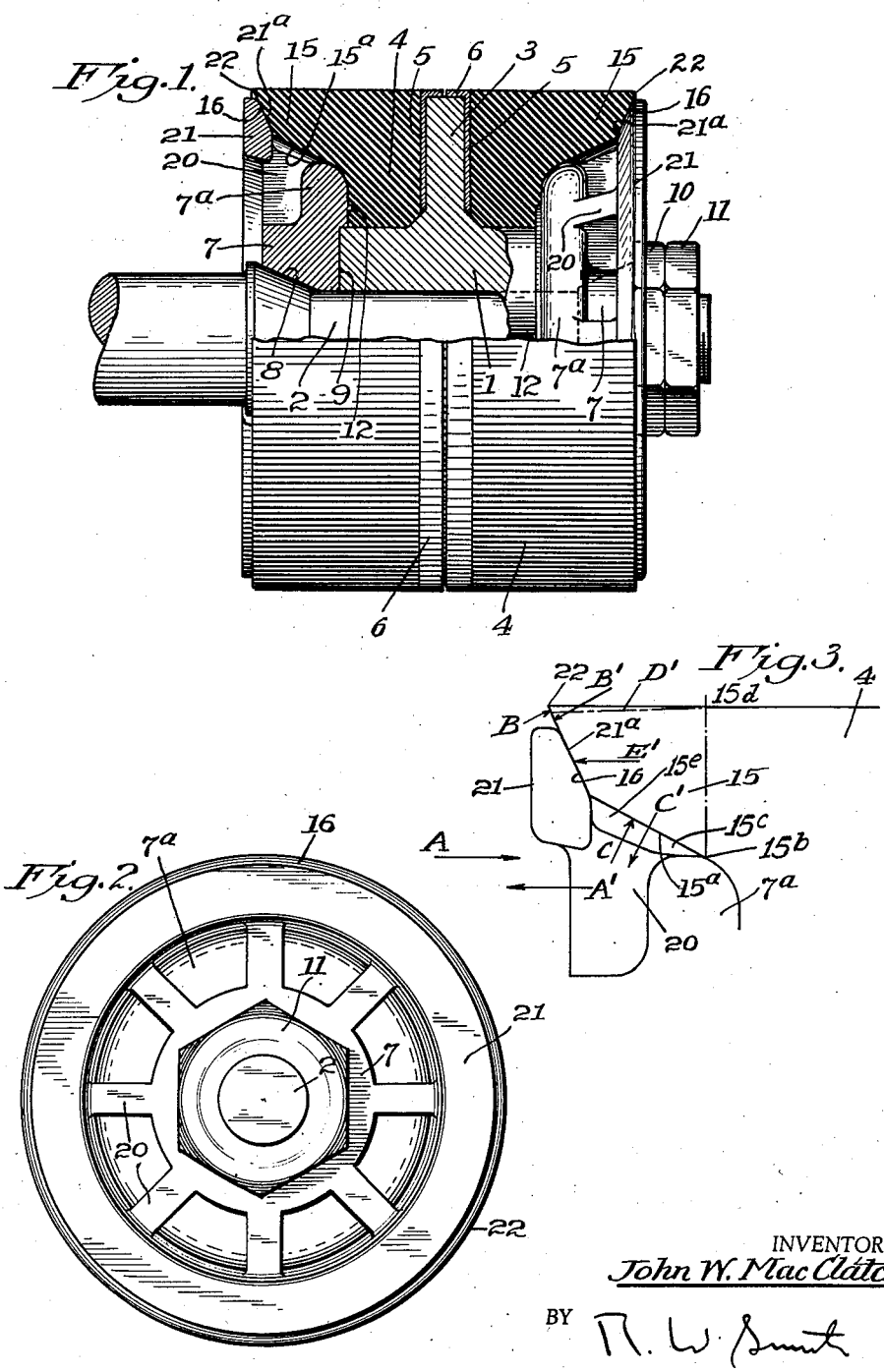
INVENTOR.
John W. MacClatchie
BY
ATTORNEY.

Patented Jan. 24, 1939

2,144,736

UNITED STATES PATENT OFFICE

2,144,736
PACKING

John W. MacClatchie, Los Angeles, Calif., assignor to MacClatchie Manufacturing Company of California, Compton, Calif., a corporation of California Application July 2, 1935, Serial No. 29,497

7 Claims. (Cl. 309—23)

This invention relates to means for packing a pump piston or other device adapted for reciprocation in a cylinder and including yieldable packing adapted for sealing contact with the cylinder wall; and it is the object of the invention to maintain sealing contact of the yieldable packing during a pressure stroke, and on the suction stroke to limit radial contraction of the packing so that it may yield only sufficiently to prevent excessive frictional contact with the cylinder wall, with no possibility of the backing being drawn away from the cylinder wall to a degree permitting abrasives to lodge between the packing and the cylinder wall.

More particularly it is the object of the invention to provide a follower for the yieldable packing, preferably directing fluid pressure from the cylinder against the yieldable packing on the pressure stroke for maintaining sealing contact with the cylinder wall, with the follower forming an abutment for the yieldable packing whereby the packing may preferably yield on the suction stroke to a limited degree such as will avoid excessive frictional contact, but with the abutment opposing any tendency toward excessive radial contraction of the yieldable packing such as might space the packing from the cylinder wall to a degree permitting abrasives to lodge between the yieldable packing and the cylinder wall.

It is a further object of the invention to provide longitudinal backing for the yieldable packing, cooperating with the follower so that the packing may be longitudinally compressed to a degree insuring its radial expansion for sealing contact with the cylinder wall on the pressure stroke, and also cooperating with the follower to prevent such distortion of the yieldable packing during the suction stroke as might permit lodgement of abrasives between the packing and the cylinder wall.

Further objects of the invention will be readily understood from the following description of the accompanying drawing, in which:

Fig. 1 is a side elevation of a piston embodying the invention, partly in axial section.

Fig. 2 is an end view of the piston.

Fig. 3 is a diagram illustrating the operation of the yieldable packing.

The invention is illustrated embodied in a double acting piston, which may comprise a hub 1 mounted on a piston rod 2 with a packing element mounted on the hub at each side of the radial flange 3 which may project integrally from the hub 1 intermediate of its ends. Each packing element includes a yieldable packing annulus 4 which may be rubber or suitable composition, and the flange 3 forms a longitudinal backing for each packing element on its pressure stroke.

Means may be provided for preventing excessive distortion of the inner end of each packing annulus on the suction stroke of the packing element of which it forms a part, and for this purpose a reinforcement plate 5 may form a part of each packing element, being preferably fixed to the inner end of the packing annulus 4 and adapted to abut the flange 3 as shown at Fig. 1. The packing annulus 4 may be molded to the reinforcement plate 5, and the periphery of the reinforcement plate is preferably longitudinally flanged as shown at 6 so as to overlie the periphery of the radial flange 3. The reinforcement plate 5 of each packing element is of a material such as brass, whereby it has some inherent flexibility accommodating it to normal pressure responsive distortion of its yieldable packing annulus 4, but also having such inherent rigidity as will prevent excessive distortion at the inner end of its yieldable packing annulus on the suction stroke of the packing element of which it forms a part.

The packing elements are secured on hub 1 by follower plates 7 which are mounted on the piston rod 2 at the outer ends of the respective packing elements; and in the illustrated embodiment the parts are held in assembled relation by wedging one of the follower plates on the piston rod as shown at 8, with the hub 1 clamped between the follower plates as shown at 9, and with the other follower plate secured on the piston rod by a retaining nut 10 and a lock nut 11.

The follower plates 7 project radially beyond the hub 1 so as to longitudinally engage the outer ends of the yieldable packing annuli 4, in order to clamp the packing elements against the radial flange 3; and the follower plates are preferably so arranged that on the pressure stroke of each packing element the fluid pressure maintains sealing contact by the yieldable packing. The arrangement of the follower plates is also such that during the suction stroke of each packing element, the outer periphery of its yieldable packing annulus is preferably adapted for such limited radial contraction as will eliminate excessive frictional contact, but with the yieldable packing annulus positively held against such contraction as would space it from the cylinder wall to a degree permitting lodgement of abrasives between the yieldable packing annulus and the cylinder wall.

As an instance of this arrangement the outer peripheral portions of packing annuli 4 are longitudinally extended as shown at 15 so as to form cup-shaped packing annuli with the inner surfaces of the side walls of the cups flaring as shown at 15a, and the rims of these cup-shaped packing annuli form annular plane abutment surfaces 16 which are of appreciable radial width and which are inclined somewhat toward the bottoms of the cup-shaped packing annuli as shown at Fig. 1. The abutment surfaces 16 thus form angles with the longitudinal axis of the piston which are somewhat less than angles of ninety degrees, e. g. angles in the neighborhood of sixty-five degrees.

The follower plates 7 include abutment plates or discs 7a which engage the bottoms of the cup-shaped packing annuli 4, and to prevent the bottoms of the yieldable packing annuli being drawn away from their follower plates on the suction stroke, each disc 7a may have an annular rib 12 adapted for reception in an annular groove in the bottom of the cooperating packing annulus 4. When the follower plates 7 are clamped against the ends of the hub 1, the discs 7a thus fit snugly against the bottoms of the packing annuli 4, and the packing annuli fit snugly around the peripheries of the discs 7a where the bottoms of the packing annuli merge into their side walls 15, but due to the flare of the inner surfaces 15a of the side walls of the packing cups, this snug fit is maintained for no appreciable distance longitudinally of the piston, terminating at the point 15b. Beyond this point the major portion of the length of the peripheries of the discs 7a are appreciably spaced from the flaring surfaces 15a as shown at 15c. Since it is only the outer ends of the side walls 15 and not the bottoms of the packing annuli which radially flex on the pressure and suction strokes of the piston, the portions of the packing annuli which are subject to such flexing do not extend toward the bottoms of the packing annuli beyond the radial prolongation of the point 15b, indicated at 15b—15d, and consequently an appreciable space is maintained at 15c, between the discs 7a and the side walls 15 of the packing annuli, so that when the side walls 15 flex, the space 15c never becomes a mere crack such as might trap sand, but retains such size that any sand entering this space will be washed away without liability of clogging therein.

At the outer surfaces of the discs 7a, supporting arms 20 project longitudinally of the piston in circumferentially spaced relation, with said arms preferably flaring toward their outer ends and extending along the length of the flaring inner surfaces 15a of the side walls of the cup-shaped packing annuli, preferably in radially spaced relation from said flaring surfaces 15a, so as to form spaces 15e. The spaces between the circumferentially spaced arms 20 are without abrupt recesses, and communicate freely with the space 15e, so that the entire space which is thus provided forms neither pockets nor mere cracks in which sand might be trapped but is of adequate size to insure free circulation in the spaces between the arms 20 and in the spaces 15e and 15c, so that sand or the like is immediately washed away with no liability of clogging between the packing annulus and its follower plate.

The arms 20 of each follower plate support an abutment annulus 21 which longitudinally engages the abutment surface 16 of the cooperating cup-shaped packing annulus. The annular surface 21a of the abutment annulus which engages the inclined annular abutment surface 16 is inclined at a corresponding inclination, and the outer periphery of the abutment 21 preferably terminates radially just short of the outer periphery of its cooperating packing annulus. The extreme outer ends of the packing annuli thus form comparatively blunt lips 22 which project a slight distance radially beyond the abutments 21.

During the pressure stroke at either end of the piston, fluid pressure indicated by arrow A (Fig. 3) expands the lip 22 as shown by arrow B, and the circumferential spacing of arms 20 permits fluid pressure being exerted against the tapering surfaces 15a of the cup-shaped packing annulus as shown by arrow C. The yieldable packing is thus radially expanded both at its lip 22 and along the length of the packing annulus, but not beyond the line 15b—15d, with the flange 3 providing a longitudinal backing for the yieldable packing to insure its radial expansion responsive to fluid pressure. The bottom of the cup-packing is thus clamped tightly between the flange 3 and the disc 7a, with no liability of a crack being opened between the bottom of the cup-packing and the disc 7a since it is not this bottom but the side wall 15 of the cup-packing which is subject to radial flexing, and along the side wall 15 where such flexing occurs the space 15c—15e maintains a space greater than a mere crack and thus insures free circulation therein so that sand will be washed away as fast as it collects. As a consequence there is no liability of sand lodging between the packing annulus and the follower plate, as would prematurely cut out the packing.

On the suction stroke, indicated by arrow A¹ (Fig. 3), the suction may slightly radially contract the lip 22 as indicated by arrow B¹, due to the lip projecting radially slightly beyond the abutment 21; and as a result of the space between the inner surface 15a of the side wall of the packing cup and the adjacent arms 20, the suction may slightly radially contract the side wall 15 of the packing cup as indicated by arrow C¹, with this radial flexing confined between the line 15b—15d and the outer end of the side wall 15. The outer peripheral surface of the packing annulus may thus yield to a limited degree as indicated in exaggerated form by broken line D¹, whereby the yieldable packing is relieved of excessive frictional contact with the cylinder wall, but at the same time suction exerted on the yieldable packing will force it longitudinally against the abutment 21 as indicated by arrow E¹, thereby holding the yieldable packing against excessive distortion responsive to suction, and as a result of the pressure thus exerted at the cooperating inclined abutment surfaces 16—21a, the packing annulus is wedged along the inclined abutment surface 21a so as to tend to radially outwardly displace the packing annulus. This wedging tendency opposes the tendency of the packing annulus to excessively radially contract responsive to suction exerted at arrows B¹ and C¹, and the yieldable packing is thereby positively held against excessive distortion, but may yield to such limited degree as will just relieve excessive frictional contact with the cylinder wall, while preventing such spacing of the packing annulus from the cylinder wall as would permit the lodgment of abrasives between the packing element and the cylinder wall, and with the space 15c—15e maintained of such appreciable size as will insure free circulation therein and free circulation being also maintained in the relatively large spaces between the arms 20, so that there is no liability of abrasives lodging between the packing element and its follower plate.

I claim:

1. In combination, yieldable cup-shaped packing having a bottom and an annular side wall, the inner surface of the side wall flaring toward its outer end and the side wall terminating at its outer end in a rim having a surface at an appreciable angle to the flaring inner surface of the side wall and inclined slightly toward the bottom of the packing, and a follower including an abutment plate, supporting arms and an annular abutment, the abutment plate engaging the bottom of the packing, the supporting arms projecting longitudinally from the abutment plate in circumferentially spaced relation and extending along the side wall of the packing in radially spaced relation from its flaring inner surface, and the annular abutment being at the outer ends of the supporting arms and longitudinally engaging the inclined surface of the rim of the packing and being inclined substantially in accordance with the inclination of said inclined surface.

2. In combination, yieldable cup-shaped packing having a bottom and an annular side wall, the side wall terminating at its outer end in a rim having a surface inclined toward the bottom of the packing, and a follower including an abutment plate, supporting arms and an annular abutment, the abutment plate engaging the bottom of the packing, the supporting arms projecting longitudinally from the abutment plate in circumferentially spaced relation and extending along the annular side wall of the packing in radially spaced relation therefrom, and the annular abutment being at the outer ends of the supporting arms and longitudinally engaging the inclined surface of the rim of the packing.

3. In combination, yieldable cup-shaped packing having a bottom and an annular side wall, the side wall terminating at its outer end in a rim having a surface inclined toward the bottom of the packing, and a follower including an abutment plate, supporting arms and an annular abutment, the abutment plate engaging the bottom of the packing, the supporting arms projecting longitudinally from the abutment plate in circumferentially spaced relation and extending along the annular side wall of the packing, and the annular abutment being at the outer ends of the supporting arms and longitudinally engaging the inclined surface of the rim of the packing.

4. In combination, yieldable cup-shaped packing having a bottom and an annular side wall, the inner surface of the side wall flaring toward its outer end and the side wall terminating at its outer end in a rim having a surface at an appreciable angle to the flaring inner surface of the side wall and inclined slightly toward the bottom of the packing, and a follower including an abutment plate, supporting arms and an annular abutment, the abutment plate engaging the bottom of the packing, the supporting arms projecting longitudinally from the abutment plate in circumferentially spaced relation and extending along the annular side wall of the packing, and the annular abutment being at the outer ends of the supporting arms and longitudinally engaging the inclined surface of the rim of the packing and being inclined substantially in accordance with the inclination of said inclined surface, the flaring inner surface of the side wall of the packing being radially spaced from the supporting arms and being radially spaced from the peripheral surface of the abutment plate along at least that portion of the length of said peripheral surface which extends from the outer face of the abutment plate and which is the major portion of said length.

5. In combination, yieldable cup-shaped packing having a bottom and an annular side wall, the side wall terminating at its outer end in a rim having a surface inclined toward the bottom of the packing, and a follower including an abutment plate, supporting arms and an annular abutment, the abutment plate engaging the bottom of the packing, the supporting arms projecting longitudinally from the abutment plate in circumferentially spaced relation and extending along the annular side wall of the packing, and the annular abutment being at the outer ends of the supporting arms and longitudinally engaging the inclined surface of the rim of the packing, the inner surface of the side wall of the packing being radially spaced from the peripheral surface of the abutment plate along at least that portion of the length of said peripheral surface which extends from the outer face of the abutment plate.

6. A follower for a cup-shaped packing which has a rim at the outer end of the side wall of the cup having a surface inclined toward the bottom of the cup, the follower including an abutment plate, supporting arms and an annular abutment, the abutment plate being adapted to engage the bottom of the packing, the supporting arms projecting longitudinally from the abutment plate in circumferentially spaced relation and being adapted to extend along the side wall of the cup in radially spaced relation therefrom, and the annular abutment being at the outer ends of the supporting arms and adapted to longitudinally engage the inclined surface of the rim of the cup.

7. A follower for a cup-shaped packing which has a rim at the outer end of the side wall of the cup having a surface inclined toward the bottom of the cup, the follower including an abutment plate, supporting arms and an annular abutment, the abutment plate being adapted to engage the bottom of the packing, the supporting arms projecting longitudinally from the abutment plate in circumferentially spaced relation and being adapted to extend along the side wall of the cup and the annular abutment being at the outer ends of the supporting arms and adapted to longitudinally engage the inclined surface of the rim of the cup.

JOHN W. MacCLATCHIE.